April 11, 1961     E. W. JONES     2,979,278
TEXTILE MACHINES
Filed June 16, 1959
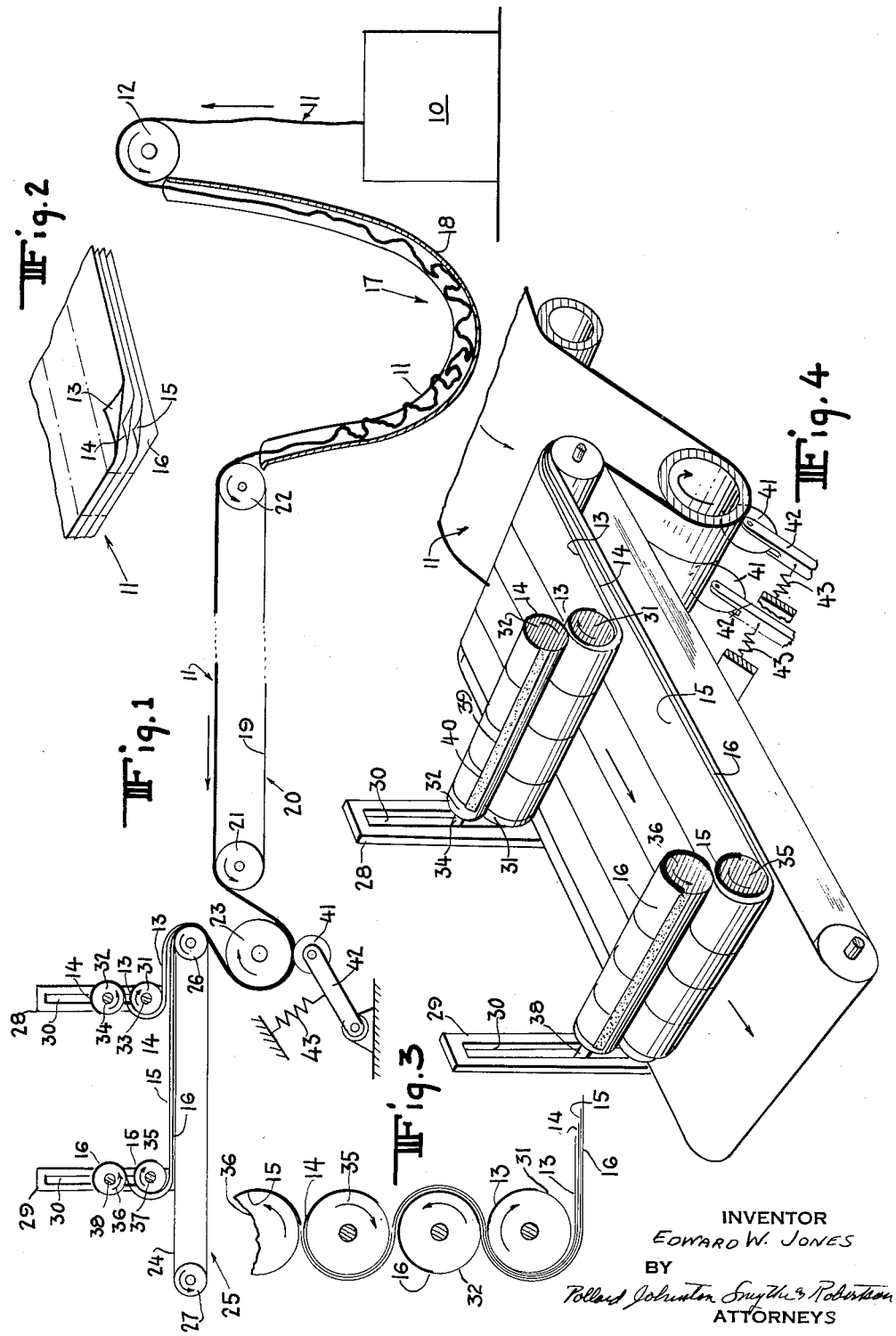
INVENTOR
EDWARD W. JONES
BY
Pollard Johnston Smythe & Robertson
ATTORNEYS United States Patent Office 2,979,278
Patented Apr. 11, 1961

2,979,278
TEXTILE MACHINES
Edward W. Jones, Waterville, N.Y., assignor to Elastic Fabric Co., Inc., New York, N.Y., a corporation of Delaware
Filed June 16, 1959, Ser. No. 820,630
16 Claims. (Cl. 242—56.4)

The present invention relates to a method of, and an apparatus for, handling a continuous sheet of fabric made up of a plurality of superimposed or stacked layers of fabric, and particularly to such a method and apparatus for separating and rolling into individual rolls, one or more of said layers of fabric.

While the principles of the invention are applicable to the separating and rolling into individual rolls of one or more layers of any multi-layer fabric, they will be shown and described as applied to the separating of each layer of a continuous multi-layer sheet of loosely woven fabric, which multi-layer fabric sheet has been shrunk to provide a plurality of layers of fabric each having a high degree of stretchability and elasticity in both a longitudinal and a transverse direction.

The principal object of this invention is to provide a method of, and apparatus for separating and rolling into individual rolls, one or more layers of a continuous multi-layer sheet of fabric.

Another object of this invention is to provide such a method and apparatus in which the feeding of the multi-layer sheet to the individual rolls provides the rotary power to rotate said individual rolls.

Another object of this invention is to provide such a method and apparatus in which the multi-layer fabric sheet may be slit into strips of any desired width prior to being separated and rolled into individual rolls.

Another object is to provide such a method and apparatus in which the rolls may be arranged along, and in contact with, an endless belt conveyor.

Another object of this invention is to provide such an apparatus and method in which the rolls are floatingly stacked at spaced locations with the rolls of each stack in frictional driving relation with each other and the bottom roll of each stack is in frictional driving engagement with an endless belt conveyor.

Another object of this invention is to provide such an apparatus and method in which the rolls are floatingly stacked in a single stack in frictional driving relation with each other and the bottom roll is in frictional driving engagement with an endless belt conveyor.

In one aspect of the invention, a continuous multi-layer sheet of loosely woven fabric, which has been subjected to a shrinking process in a manner to provide a multi-layer sheet of fabric having a high degree of stretchability and elasticity in both a longitudinal and transverse direction, may be fed in a free loop to the top reach of an endless belt conveyor. The conveyor belt may frictionally engage the sheet and feed it to an idle roll beneath and between the conveyor and another endless belt conveyor that is aligned longitudinally with the first.

In another aspect of the invention, a plurality of parallel, horizontally disposed rolls may be vertically stacked in floating relation and transversely arranged with the bottom roll in frictional engagement with the top reach of the second mentioned conveyor. Each roll above the bottom one of the stacked rolls may frictionally engage the roll next adjacent to it. In this way, power supplied to the conveyor belt supporting the rolls frictionally drives alternate rolls in the stack of rolls in opposite directions.

In another aspect of the invention, the multilayer sheet may be fed along the top reach of the second conveyor beneath the bottom roll of the stacked rolls and the top layer of said multi-layer sheet may be affixed to the bottom roll while the next to the top layer may be affixed to the roll just above the bottom roll.

If the multi-layer fabric comprises more than two layers, say for example, four layers, two alternative arrangements may be employed. One of these arrangements may include another set of rolls spaced along the second conveyor and arranged identically to the arrangement of the first mentioned stacked rolls in frictional driving relation with the conveyor belt. In this arrangement, the third and fourth layer from the top of the multi-layer sheet may be fed along the conveyor to the spaced set of rolls and the third from the top layer affixed to the bottom roll of this set and the fourth from the top layer affixed to the top roll of this spaced set of rolls.

In still another aspect of the invention the two sets of rolls may be combined at one location providing four floating stacked rolls. In this case, the first layer of the multi-layer fabric may be affixed to the bottom roll of the stack of four; the fourth layer from the top affixed to the next to the bottom roll; the second layer from the top affixed to the third roll of the stack; and the third layer from the top affixed to the top roll of the four stacked rolls.

In either case, supplying power to the conveyor belt that supports the stacked rolls will automatically cause the separation of each layer and its winding onto an individual roll. Of course, one or more layers may be wound on each roll if so desired.

In another aspect of the invention, slitting knives may be provided for severing the sheet into strips of any desired width, and this may be done as the sheet passes over the idle roll between the two belt conveyors.

The above, other objects and novel features of the invention will become apparent from the following specification and accompanying drawing which is merely exemplary.

In the drawing:
Fig. 1 is a schematic disclosure of a system to which the principles of the invention have been applied;
Fig. 2 is a view of a portion of a multi-layer sheet of fabric, which layers may be separated and rolled on individual rolls according to the principles of the invention;
Fig. 3 is a view of a detail of a modified form of the stacked rolls shown in Fig. 1; and
Fig. 4 is a perspective enlarged view of a portion of the apparatus shown in Fig. 1.

Referring to Fig. 1, the principles of the invention are shown as applied to a system including a hopper 10 from which a continuous sheet of multi-layer fabric 11 may be fed upwardly over a guide roll 12. Referring to Fig. 2, the fabric sheet 11 may comprise any number of layers and in the embodiment disclosed is shown as comprising layers 13, 14, 15 and 16. While the multi-layer sheet 11 may include layers of fabric of any desired kind, either the same or different, they are shown as layers of loosely woven cotton fabric which composite sheet has been processed to provide a fabric having a relatively high degree of stretchability and elasticity in both a longitudinal and transverse direction.

The sheet 11 may hang in a free loop 17 and be guided and supported by a metal guide member 18 which may be curved to follow the free loop 17.

The sheet 11 may be fed by the guide 18 to the top reach 19 of an endless belt conveyor 20 having rolls 21 and 22 at opposite ends, to one of which power may be applied in a known manner to rotate the conveyor 20.

The sheet 11 may lie on the top reach 19 and be frictionally engaged thereby and accordingly fed toward the roll 21.

The sheet 11 may be fed from the belt reach 19 around a roll 23, thence to the top reach 24 of a second endless conveyor belt 25 having rolls 26 and 27 at opposite ends thereof. The conveyor 25 may be located in spaced, longitudinally aligned relation with the conveyor 20, and rotary power may be applied to one of the rolls 26 and 27 in a manner to cause the belt conveyors 20 and 25 to travel at the same speed.

Vertically arranged standards 28 and 29 may be arranged in aligned parallel relation on each side of the conveyor 25 (only those on one side being shown). Each of the standards 28 and 29 may be provided with slots 30.

Rolls 31 and 32 may be stacked one over the other and may include trunnions 33 and 34 that ride within the slots 30 of the standards 28 on opposite sides of the conveyor 25. The roll 31 may rest on top of the reach 24 of conveyor 25 and the roll 32 may rest on top of the roll 31. In this way, the rolls 31 and 32 are floatingly supported in frictional engagement with each other while the roll 31 frictionally engages the belt conveyor 25. Accordingly, movement of the top reach 24 of conveyor 25 leftwardly causes rotation of the roll 31 in a clockwise direction, and roll 31 causes rotation of roll 32 in a counterclockwise direction. Furthermore, each roll 31 and 32 is permitted to move upwardly as one or more layers of the sheet 11 are rolled onto it by virtue of the floating support provided by the slots 30 while said rolls remain at all times in frictional driving relation with the other.

Another set of rolls 35 and 36 may be stacked one over the other and may include trunnions 37 and 38 that ride within slots 30 of standards 29 on each side of the conveyor 25 in the same way that rolls 31 and 32 are supported by the top stretch 24 of conveyor 25.

Referring to Fig. 4, each roll 31, 32, 35 and 36 may be provided with a fabric connecting means, which in the embodiment disclosed may comprise an axial slot 39 formed on the periphery of the rolls. A removable wedge 40 may be frictionally held within each slot 39.

The leading edge of the multi-layer sheet 11 may be fed between the top reach 24 of conveyor 25 and the bottom roll 31. The leading edge of layer 13 may be wedged into the groove 39 of roll 31 by a wedge 40, while the layer 14 may be wedged into the groove 39 of roll 32. The remaining layers 15 and 16 may be fed to the rolls 35 and 36 while the rolls 31 and 32 begin to roll up the layers 13 and 14 on the individual rolls 31 and 32, respectively.

The layer 15 may be fixed to the roll 35, while the layer 16 may be fixed to the roll 36 in the same way that layers 13 and 14 were fixed to rolls 31 and 32.

Should it be desired to slit the sheet 11 into strips of any desired width, circular cutters 41 may be journaled in arms 42 pivotally mounted and resiliently urged into cutting relation with the sheet 11 by spring means 43. The cutters 41 may be located beneath the roll 23 and in position to be spring urged into contact with the sheet 11 as it passes over the roll 23.

With the apparatus in the condition shown in Fig. 1, counterclockwise rotation of the rolls 26, 27, 21 and 22 will cause the reaches 24 and 19 to move leftwardly, thereby feeding the continuous sheet 11 to the stands of rolls 31, 32, and 35, 36. Due to the frictional engagement between the rolls 32, 31 and the rolls 36, 35, and between the rolls 31, 35 and the reach 24 of conveyor 25, rolls 31 and 35 will rotate in a clockwise direction; and, rolls 32 and 36 will rotate in a counterclockwise direction causing the layers 13, 14, 15 and 16 to be automatically separated from each other and to be rolled on the individual rolls 31, 34, 35 and 36, respectively.

If the cutters 41 are employed, there will be a plurality of strips of each layer in individual rolls in slightly spaced relation on each of the rolls 31, 32, 35 and 36, and each roll may be severed at these spacings to provide individual rolls of strips of fabric.

It is to be understood that only one pair of aligned standards 28 may be located at any point on each side of the conveyor 25 and rolls 35 and 36 may be stacked on top of rolls 31 and 32. In this case, the rolls 31 and 35 rotate in a clockwise direction while rolls 32 and 36 rotate in a counterclockwise direction as shown in Fig. 3. Additionally, layer 13 is fixed to roll 31, layer 16 is fixed to roll 32, layer 14 is fixed to roll 35, and layer 15 is fixed to roll 36.

Although the various features of the invention have been shown and described in detail to fully disclose several embodiments of the invention, it is evident that changes may be made in such details and certain features may be used without others without departing from the principles of the invention.

What is claimed is:

1. The method of separating and rolling onto individual rolls, separate layers of a continuous multi-layer sheet of fabric arranged in a single plane which comprises floatingly supporting said individual rolls on an endless conveyor belt; feeding said sheet of fabric to said rolls; connecting successive layers of said fabric to separate of said floatingly supported rolls; and moving said conveyor belt in a manner to cause said rolls to turn in a direction to roll each layer of fabric onto the corresponding roll to which it is connected.

2. The method of separating and rolling onto individual rolls, separate groups of layers of a continuous multi-layer sheet of fabric arranged in a single plane which comprises floatingly supporting said individual rolls on an endless conveyor belt; feeding said sheet of fabric to said rolls; connecting successive groups of said layers of said fabric to separate of said floatingly supported rolls; and moving said conveyor belt in a manner to cause said rolls to turn in a direction to roll each group of layers onto the corresponding roll to which said group is connected.

3. The method of separating and rolling onto individual rolls, separate layers of a continuous multi-layer sheet of fabric which comprises floatingly supporting in stacked relation a plurality of individual rolls such that each roll from the bottom roll frictionally contacts the periphery of the next adjacent lower roll; connecting the top layer of said multi-layer sheet to said bottom roll, and the next to the top layer to the roll next adjacent to said bottom roll; and rotating said bottom roll in a direction to separate and roll said top and said next to the top layer of said multi-layer fabric onto the rolls to which they are attached.

4. The method of separating and rolling onto individual rolls, separate layers of a continuous multi-layer sheet of fabric which comprises floatingly supporting in stacked relation more than two individual rolls such that each next succeeding roll from the bottom roll frictionally rests on the periphery of the next adjacent lower roll; connecting the remaining top and bottom layers of said multi-layer fabric, respectively, to the lower and upper next adjacent rolls of each group of two rolls each beginning with the bottom of said stacked rolls; and rotating said bottom roll in a direction to separate and roll said separate layers onto the corresponding rolls to which they are connected.

5. The method of separating and rolling onto individual rolls, separate layers of a continuous multi-layer sheet of fabric which comprises floatingly supporting in stacked relation a plurality of individual rolls on an endless belt conveyor such that the bottom roll contacts the belt and the next adjacent roll rests on the periphery of the bottom roll; feeding said multi-layer sheet between said belt and said bottom roll; connecting the top layer of said multi-layer sheet to said bottom roll, and the next to the top layer to the roll next adjacent to said bottom roll; and moving said conveyor belt in a manner to cause said rolls to be frictionally rotated in a direction to separate and roll said top and said next to the top layer onto the rolls to which they are connected.

6. The method of separating and rolling onto individual rolls, separate layers of a continuous multi-layer sheet of fabric which comprises floatingly supporting in stacked relation more than two individual rolls on an endless conveyor belt such that the bottom roll contacts the belt and the next succeeding roll rests on the periphery of the next lower roll; feeding said multi-layer sheet between said belt and bottom roll; connecting the remaining top and bottom layers of said multi-layer fabric, respectively, to the lower and upper next adjacent rolls of each group of two rolls each beginning with the bottom of said stacked rolls; and moving said conveyor belt in a manner to cause said rolls to be frictionally rotated in a direction to separate and roll said separate layers onto the corresponding rolls to which they are connected.

7. The method of separating and rolling onto individual rolls, separate layers of a multi-layer sheet of fabric which comprises supporting a plurality of vertically stacked rolls on an endless belt conveyor so that the bottom roll rests on the conveyor and the next adjacent roll above the bottom roll rests on the next adjacent lower roll; feeding said multi-layer fabric between said bottom roll and said conveyor; connecting the top layer of said fabric to said bottom roll; connecting the layer next below said top layer to the roll supported by said bottom roll; and moving said conveyor in a direction to cause said multi-layer fabric to continuously pass between said bottom roll and said conveyor.

8. The method of separating and rolling onto individual rolls, separate layers of a multi-layer sheet of fabric which comprises supporting a plurality of sets of stacked rolls in spaced relation along an endless belt conveyor so that the bottom roll of each steak rests on the conveyor belt and the next adjacent roll of each stack rests on the next adjacent lower roll; feeding said multi-layer fabric sheet between the bottom roll of the first stack and said belt conveyor; connecting the top layer and the next to the top layer of fabric, respectively, to the bottom and next adjacent roll of said first stack; feeding the remaining layers of said fabric along said belt conveyor to the next spaced stack of rolls and beneath the bottom roll thereof; connecting the top and next to the top layer of said remaining layers, respectively, to the bottom and next adjacent roll of said second stack of rolls; and moving said conveyor belt in a manner to cause said rolls to roll thereon the layer of fabric connected thereto.

9. Apparatus for separating and rolling onto individual rolls, separate layers of a multi-layer sheet of fabric comprising in combination, means for feeding a continuous sheet of multi-layer fabric in one direction along a linear path; means for floatingly supporting stacked rolls in frictional engagement at spaced points along the path of motion of said fabric; means for connecting the top and next to the top layer of said fabric, respectively, to the bottom roll and next adjacent roll in the first stack of rolls in the direction of feeding; means for connecting the remaining top and next to the remaining top layer of said fabric, respectively, to the bottom roll and next adjacent roll in the second stack of rolls in the direction of feeding; and means responsive to said feeding means for rotating the bottom roll of each stack of rolls.

10. Apparatus for separating and rolling onto individual rolls, separate layers of a multi-layer sheet of fabric comprising in combination, means for feeding a continuous sheet of a multi-layer fabric along a path; means for floatingly supporting more than two rolls in frictional driving engagement in a stack at a point along said path; means for connecting the remaining top and bottom layers of said multi-layer fabric, respectively, to the lower and upper next adjacent rolls of each group of two rolls each beginning with the bottom of said stacked rolls; and means responsive to said feeding means for rotating the bottom roll of said stacked rolls.

11. In an apparatus for separating separate layers of a multi-layer continuous sheet of fabric which has been shrunk to provide a high degree of elasticity and stretchability comprising in combination, a first endless belt conveyor adapted to have fed to it a continuous sheet of said multi-layer fabric; a second endless belt conveyor spaced from and longitudinally aligned with said first conveyor; an idler roll between said conveyors, and around which said fabric passes in being fed to said second conveyor; means for floatingly supporting rolls at spaced points along the path of motion of said fabric; means for connecting the top layer of said multi-layer fabric to the first roll in the direction of feeding of said fabric; means for connecting the remaining top layer to the next spaced roll in the direction of feeding of said fabric; and means for driving said second conveyor belt.

12. In an apparatus for separating separate layers of a multi-layer continuous sheet of fabric which has been shrunk to provide a high degree of elasticity and stretchability comprising in combination, a first endless belt conveyor adapted to have fed to it a continuous sheet of said multi-layer fabric; a second endless belt conveyor spaced from and longitudinally aligned with said first conveyor; an idler roll between said conveyors, and around which said fabric passes in being fed to said second conveyor; pairs of vertically disposed arms, each having a vertically arranged slot therein located in spaced relation on each side of said second conveyor; rolls having trunnions adapted to be slidingly received within the slots of corresponding of said arms; means for connecting the top layer of said multi-layer fabric to the first roll in the direction of feeding of said fabric; means for connecting the remaining top layer to the next spaced roll in the direction of feeding of said fabric; and means for driving said second conveyor belt.

13. In an apparatus for separating separate layers of a multi-layer continuous sheet of fabric which has been shrunk to provide a high degree of elasticity and stretchability comprising in combination, a first endless belt conveyor adapted to have fed to it a continuous sheet of said multi-layer fabric; a second endless belt conveyor spaced from and longitudinally aligned with said first conveyor; an idler roll between said conveyors, and around which said fabric passes in being fed to said second conveyor; means for floatingly supporting stacked rolls in frictional engagement at spaced points along said second conveyor with the bottom roll of each stack in frictional engagement with said second conveyor; means for connecting the top and next to the top layer of said fabric, respectively, to the bottom roll and next adjacent roll in the first stack of rolls in the direction of feeding; means for connecting the remaining top and next to the remaining top layer of said fabric, respectively, to the bottom roll and next adjacent roll in the second stack of rolls in the direction of feeding; and means for driving said second conveyor.

14. In an apparatus for separating separate layers of a multi-layer continuous sheet of fabric which has been shrunk to provide a high degree of elasticity and stretchability comprising in combination, a first endless belt conveyor adapted to have fed to it a continuous sheet of said multi-layer fabric; a second endless belt conveyor spaced from and longitudinally aligned with said first conveyor; an idler roll between said conveyors, and around which said fabric passes in being fed to said second conveyor; means for floatingly supporting more than two rolls in frictional driving engagement in a stack at a point along said second conveyor with the bottom roll of said stack in frictional engagement with said second conveyor; means for connecting the remaining top and bottom layers of said multi-layer fabric, respectively, to the lower and upper next adjacent rolls of each group of two rolls each beginning with the bottom of said stacked rolls; and means for driving said second conveyor.

15. In an apparatus for separating separate layers of a multi-layer continuous sheet of fabric which has been shrunk to provide a high degree of elasticity and stretchability comprising in combination, a first endless belt conveyor adapted to have fed to it a continuous sheet of said multi-layer fabric; a second endless belt conveyor spaced from and longitudinally aligned with said first conveyor; an idler roll between said conveyors, and around which said fabric passes in being fed to said second conveyor; means for floatingly supporting rolls at spaced points along the path of motion of said fabric; means for connecting the top layer of said multi-layer fabric to the first roll in the direction of feeding of said fabric; means for connecting the remaining top layer to the next spaced roll in the direction of feeding of said fabric; means for driving said second conveyor belt; and cutter means adapted to cooperate with said idler roll for severing said sheet into strips.

16. In an apparatus for separating separate layers of a multi-layer continuous sheet of fabric which has been shrunk to provide a high degree of elasticity and stretchability comprising in combination, a first endless belt conveyor adapted to have fed to it a continuous sheet of said multi-layer fabric; a second endless belt conveyor spaced from and longitudinally aligned with said first conveyor; an idler roll between said conveyors, and around which said fabric passes in being fed to said second conveyor; means for floatingly supporting more than two rolls in frictional driving engagement in a stack at a point along said second conveyor with the bottom roll of said stack in frictional engagement with said second conveyor; means for connecting the remaining top and bottom layers of said multi-layer fabric, respectively, to the lower and upper next adjacent rolls of each group of two rolls each beginning with the bottom of said stacked rolls; means for driving said second conveyor; and cutter means adapted to cooperate with said idler roll for severing said sheet into strips.

References Cited in the file of this patent
UNITED STATES PATENTS

| | | |
|---|---|---|
| 1,095,661 | Moulton | May 5, 1914 |
| 1,648,990 | Little | Nov. 15, 1927 |
| 2,593,154 | Judelson | Apr. 15, 1952 |